No. 877,245. PATENTED JAN. 21, 1908.
E. A. SPERRY.
APPARATUS FOR EFFECTING REACTIONS.
APPLICATION FILED MAR. 5, 1906.

2 SHEETS—SHEET 1.

Witnesses
Inventor
Elmer A. Sperry
By Byrnes & Townsend
Attys.

UNITED STATES PATENT OFFICE.

ELMER A. SPERRY, OF BROOKLYN, NEW YORK, ASSIGNOR TO CHEMICAL REDUCTION COMPANY, OF NEW YORK, N. Y., A CORPORATION OF NEW YORK.

APPARATUS FOR EFFECTING REACTIONS.

No. 877,245.

Specification of Letters Patent.

Patented Jan. 21, 1908.

Application filed March 5, 1906. Serial No. 304,416.

*To all whom it may concern:*

Be it known that I, ELMER A. SPERRY, a citizen of the United States, residing at Brooklyn, in the county of Kings and State of New York, have invented certain new and useful Improvements in Apparatus for Effecting Reactions, of which the following is a specification.

The object of this invention is to provide a reaction apparatus by means of which the reacting bodies are brought into intimate and effective contact. The apparatus is more particularly intended for bringing solids and gases into reacting relation through the intermediary of a liquid capable of dissolving the gas.

A preferred form of apparatus is shown in the accompanying drawings wherein—

Figure 1:
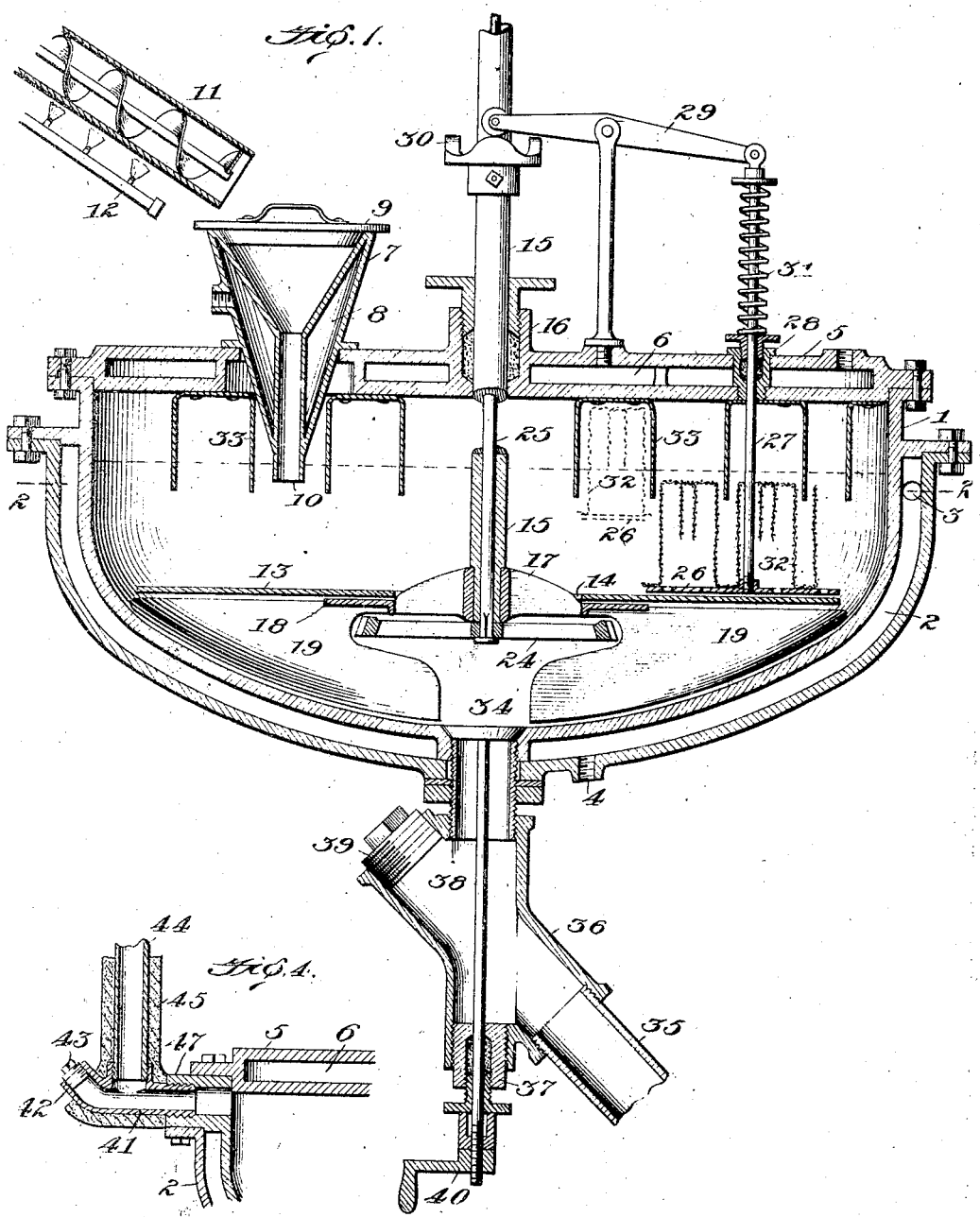
Figure 2:
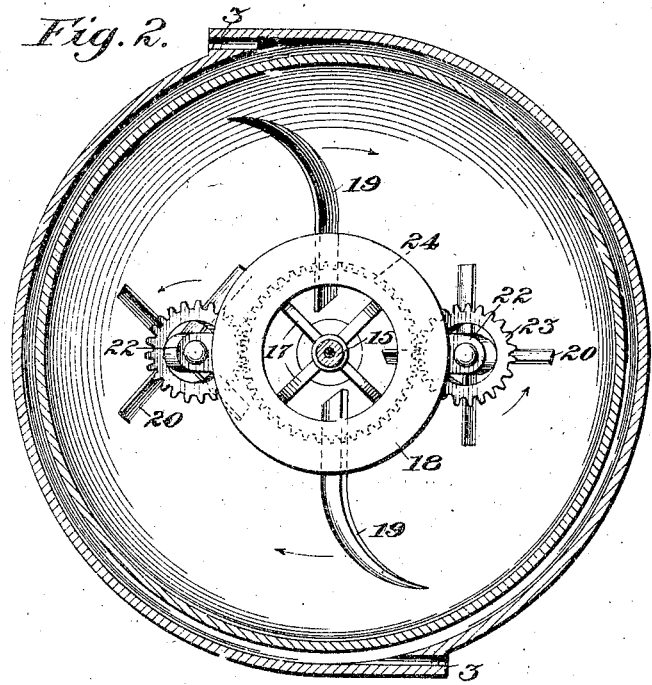
Figure 3:
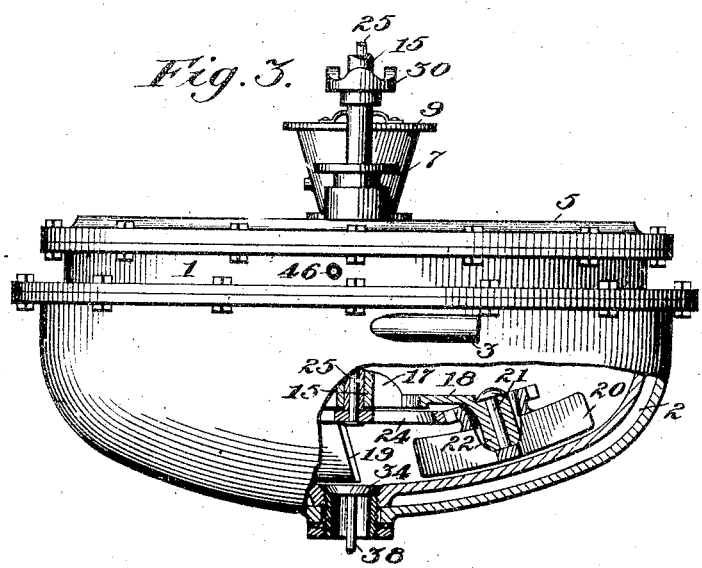

Figure 1 is a central longitudinal section of a preferred form of the reaction vessel; Fig. 2 is a horizontal section of the same on a somewhat smaller scale on line 2—2 of Fig. 1, the septum and reciprocating devices being removed; Fig. 3 is a side elevation on the same scale as Fig. 2, parts being broken away, and the septum and disk-reciprocating devices removed; and Fig. 4 is a detail section of one of the gas connections.

1 represents a relatively shallow vessel which may be constructed of cast iron, lead, or which may be constructed of or lined with any material adapted to resist the particular reagents to be used. The body of the vessel is provided with a jacket 2 having tangential inlets 3, 3 for steam or water, and an outlet 4, this arrangement being found to insure a substantially even heating or cooling effect. The cover 5 is removable, and is provided with interior passages 6 for water. The cover supports a removable hopper 7 jacketed as shown at 8 for heating the contents thereof. The hopper is provided with a cover 9 and depends into the vessel as shown at 10 to a sufficient depth to be sealed by the liquid therein. Charging means 11 located above the hopper are preferably provided with means, indicated at 12, for heating the incoming material.

13 is a septum, suitably supported within the vessel, and illustrated as a horizontal ring-shaped disk, spaced from the walls of the vessel at its periphery and having a central aperture 14. A hollow shaft 15 extends through a stuffing-box 16 in the cover and carries at its lower end arms 17 supporting an annular disk 18 to which are secured lifting and stirring blades 19. These blades are preferably two in number and are oppositely disposed, the effect of this arrangement, together with the conformation of the blades, being to produce a wave action at the surface of the liquid, the purpose of which is to expose an extended surface of the same as hereinafter more fully explained. The blades extend approximately to the bottom of the vessel and are forwardly inclined in the direction of movement in such manner as to exert a lifting action on its liquid or solid contents; the outer ends of the blades may be curved backward as shown, the design being such as to insure an equal distribution of the materials with which they come in contact. The blades serve to impart to the liquid contents of the vessel a movement of circulation which in the particular form of device illustrated is outward beneath the disk 13 and inward above the same. The disk 13 may be carried by the shaft 15 and rotate therewith if desired. Between the blades 19 I preferably mount agitating devices, the purpose of which is to maintain finely divided solid matter in suspension in the circulating liquid, and to agitate it violently in contact therewith. As one form of agitating device I have shown inclined blades 20 mounted near the bottom of the vessel and adapted to the curvature of the same, carried by a shaft 21 supported in a bearing in a lug 22 on the disk 18. A gear 23 secured to the blades 20 meshes with a stationary gear 24 carried by a fixed shaft 25 disposed within the rotating shaft 15. As the agitating devices, of which two are shown, revolve with the disk 18 they rotate in their bearings 22 in the direction indicated by the arrows and thoroughly agitate the liquid and commingle the solids therewith. The effect of this arrangement is to maintain solids even when of relatively high specific gravity in suspension in the liquid.

Above the septum 13 I prefer to mount a perforated disk 26 and to provide means for reciprocating the same in a vertical direction, the means shown comprising a plurality of rods 27 of which one only is shown secured to the disk 26 and extending through stuffing boxes 28 in the cover; downward movement is imparted to the disk by a lever 29 actuated by a cam 30 on the shaft 15; a spring 31 serves to return the disk to its upper position. The disk 26 serves to maintain the solids in suspension in the portion of the liquid above the septum 13, and further serves to support a plurality of strips or pieces of wire-gauze or equivalent fabric or pervious structure 32, the function of which is to lift the liquid above its normal level and to expose extended surfaces of the same to the action of the gas in the upper portion of the vessel. The character and material of the liquid-exposing devices 32 will depend upon the materials treated; they should be substantially unattacked by the gas or the solvent liquid, and should possess such structure as to be capable to retaining by capillarity a film of the liquid, thereby exposing both surfaces thereof for absorption of the gas. Perforated sheets or fabrics, whether metallic or otherwise, may be available for this purpose.

In order to improve the intimacy of contact between gas and liquid I prefer to direct the former in a restricted path above the latter, and for this purpose I provide baffles or depending partitions 33 extending transversely across the vessel and adapted to be sealed by the liquid therein. The arrangement of the baffles is such as to direct the gas in a tortuous path between the inlet and outlet 46, 47. In addition to their function in directing the gas the partitions 33 coöperate with the circulating blades 19, in that they are in position to be wetted by the waves produced by these blades, thus exposing a constantly renewed liquid surface to the gas.

34 represents a discharge valve closing the upper end of the discharge conduit 35; the latter is illustrated as of special construction, comprising an angular cross 36 of which the lower aperture carries a stuffing box 37 for the valve stem 38, while one of the lateral apertures carries a removable plug 39 for convenience in cleaning. The stem 38 may be reciprocated through the stuffing box for operating the valve, and carries at its lower end a handle 40 by means of which the valve may be rotated for the purpose of grinding it to its seat or for clearing it from matter which would interfere with its seating. This feature is of particular value in valves for the discharge of finely divided solid matter.

In Fig. 4 I have shown in detail a preferred form of gas connection, comprising a pipe 41 having an upwardly inclined outer end 42, a removable closure 43 therefor, and a branch pipe 44 for the gas. The purpose of the upward inclination of the ends is to permit inspection or cleaning of the pipe 41 without danger of loss of the liquid contents of the vessel. At 45 I have shown a heat-insulating covering which is applied to the gas outlet pipe and which serves to prevent condensation or separation therein of any volatile reaction products; by properly covering said pipe I find that I am enabled to substantially prevent clogging of the same, as, for instance, by the separation of hydrated stannic chlorid in the production of stannic chlorid as hereinafter referred to. The liquid outlet in a vessel provided with circulating and agitating means may be substantially similar in construction, except that a downwardly turned branch pipe is provided; such outlet may be located somewhat above the normal liquid level, the wave action above referred to being sufficient for the discharge of any accumulation of liquid.

In most cases it is desirable that the gas-absorbing surfaces of the liquid should be maintained at a lower temperature than the reaction zone where the absorbed gas is brought into contact with the solid matter, it being well understood that absorption or solution of the gas is more rapid at lower temperatures. In the present construction this is provided for by means of the water-cooled cover through which heat is abstracted not only from the gas chamber itself but from the partitions 33 which serve as above pointed out as supplemental surfaces for the exposure of films of liquid. By means of the jacket 2 such temperature is maintained in the region of reaction as is most favorable under the particular conditions.

While my apparatus is capable of general application I may mention that it is well adapted for the production of stannic chlorid by reaction between chlorin and metallic tin or a body containing the same as set forth in my copending application Serial No. 304,328, filed March 5, 1906. It is also adapted for use in the production of metal-bearing solutions from finely divided metals, mattes, concentrates or ores, by reacting on the same with such gases as chlorin or sulfur dioxid, the solvent liquid in such case being water or a suitable aqueous solution.

I claim:—

1. Apparatus for effecting reactions comprising a relatively shallow closed vessel, means for circulating a liquid therein, a non-vertical septum for directing the circulation, a gas chamber above said septum, and means for introducing gas into said chamber.

2. Apparatus for effecting reactions comprising a relatively shallow vessel, a horizontal septum therein, a gas chamber above said septum, and means for circulating a liquid around said septum.

3. Apparatus for effecting reactions comprising a relatively shallow vessel, a horizontal septum therein, a gas chamber above said septum, and combined lifting and circulating means arranged below said septum.

4. Apparatus for effecting reactions comprising a relatively shallow vessel, means for circulating a liquid therein, a gas chamber in the upper portion of the chamber, and means for directing gas therethrough in a restricted path above the liquid level.

5. Apparatus for effecting reactions comprising a relatively shallow vessel; means for agitating a liquid therein, a gas chamber in the upper portion of the vessel, means for passing gas therethrough above the liquid level, and means for exposing an extended liquid surface to the gas.

6. Apparatus for effecting reactions comprising a relatively shallow vessel, means for circulating a liquid therein, a gas chamber in the upper portion of the vessel, means for directing gas therethrough in a restricted path above the liquid level, and means for exposing an extended liquid surface to the gas.

7. Apparatus for effecting reactions comprising a vessel, a stirring device therein, a gas chamber in the upper portion of the vessel, and means for exposing and retaining extended liquid surfaces in said gas chamber.

8. Apparatus for effecting reactions comprising a vessel, a stirring device therein, a gas chamber in the upper portion of the vessel, and mechanically operated means for exposing extended liquid surfaces in said gas chamber.

9. Apparatus for effecting reactions comprising a vessel, a stirring device therein, a gas chamber in the upper portion of the vessel, and reciprocating means for exposing and retaining extended liquid surfaces in said gas chamber.

10. Apparatus for effecting reactions comprising a vessel, a stirring device therein, a gas chamber in the upper portion of the vessel, and means for cooling said gas chamber.

11. Apparatus for effecting reactions comprising a vessel, a stirring device therein, a gas chamber in the upper portion of the vessel, means for exposing extended liquid surfaces therein, and means for cooling said gas chamber.

12. Apparatus for effecting reactions comprising a vessel, a stirring device adapted to produce a wave action therein, a gas chamber in the upper portion of the vessel, and projections in the gas chamber in position to be immersed by the waves.

13. Apparatus for effecting reactions comprising a vessel, a stirring device adapted to circulate the liquid and to produce a wave action therein, a gas chamber in the upper portion of the vessel, and projections in the gas chamber in position to be immersed by the waves.

14. Apparatus for effecting reactions comprising a vessel, a cover therefor, means for cooling the cover, and projections in contact with said cover and depending into said vessel.

15. Apparatus for effecting reactions comprising a vessel, a stirring device therein, a gas chamber in the upper portion of the vessel, means for exposing extended liquid surfaces in said gas chamber, and a covered gas passage connecting with such chamber.

16. Apparatus for effecting reactions comprising a vessel, circulating means therein having spaced blades, and agitating devices arranged between said blades.

17. Apparatus for effecting reactions comprising a vessel, means within said vessel for circulating a liquid, a septum for directing the circulation, and mechanically operated supplemental means for agitating the circulating liquid.

18. Apparatus for effecting reactions comprising a circular vessel, a ring-shaped disk in position to be submerged in the liquid therein, and means for circulating the liquid through the aperture in the disk and around its perimeter.

19. Apparatus for effecting reactions comprising a circular vessel, a ring-shaped disk in position to be submerged in the liquid therein, and a centrifugal device located near the disk and adapted to circulate the liquid through the aperture in the disk and around its perimeter.

20. Apparatus for effecting reactions comprising a vessel, circulating means therein having spaced blades, and agitating devices arranged between said blades and constructed to be operated through said circulating means.

21. Apparatus for effecting reactions comprising a vessel, and separate circulating and agitating means arranged near the bottom of the vessel, both of said means being provided with lifting surfaces.

22. Apparatus for effecting reactions comprising a vessel, a removable cover therefor, baffles carried by said cover and providing a tortuous passage beneath the same, and inlet and outlet pipes communicating with said passage.

23. Apparatus for effecting reactions comprising a closed vessel, a feeding device extending into said vessel and adapted to be sealed by the liquid in the vessel, and means for heating said feeding device.

24. Apparatus for effecting reactions comprising a closed vessel, a feeding device extending into said vessel, means for heating said feeding device, and an extension for said feeding device adapted to be sealed by the liquid in said vessel.

In testimony whereof, I affix my signature in presence of two witnesses.

ELMER A. SPERRY.

Witnesses:
C. W. FOWLER,
C. P. TOWNSEND.